(12) United States Patent
Kojima et al.

(10) Patent No.: US 8,298,080 B2
(45) Date of Patent: Oct. 30, 2012

(54) VIRTUAL SPACE DISPLAY DEVICE, VIEWPOINT SETTING METHOD, AND INFORMATION RECORDING MEDIUM

(75) Inventors: Hideo Kojima, Tokyo (JP); Masao Tomosawa, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 143 days.

(21) Appl. No.: 12/856,368

(22) Filed: Aug. 13, 2010

(65) Prior Publication Data
US 2011/0039619 A1    Feb. 17, 2011

(30) Foreign Application Priority Data

Aug. 14, 2009  (JP) .................................. 2009-188155

(51) Int. Cl.
*A63F 13/00* (2006.01)
(52) U.S. Cl. ............................................. 463/31; 463/33
(58) Field of Classification Search .................... 463/31, 463/30, 32–34
See application file for complete search history.

(56) References Cited

U.S. PATENT DOCUMENTS

| | | | |
|---|---|---|---|
| 6,283,857 B1 * | 9/2001 | Miyamoto et al. | 463/31 |
| 2001/0016518 A1 * | 8/2001 | Nishiumi et al. | 463/36 |
| 2006/0281508 A1 * | 12/2006 | Carney et al. | 463/6 |
| 2009/0104990 A1 * | 4/2009 | Tsujino et al. | 463/32 |

FOREIGN PATENT DOCUMENTS
JP        2001269482        10/2001

* cited by examiner

Primary Examiner — Arthur O. Hall
Assistant Examiner — Allen Chan
(74) Attorney, Agent, or Firm — Howard & Howard Attorneys PLLC (57) ABSTRACT

A setting unit sets a position of a viewpoint arranged in a virtual space, and a direction of a visual line extending from the viewpoint. A moving unit moves a player character in the virtual space according to an operation by a player. A generating unit generates an image representing the way the virtual space is viewed from the viewpoint toward the direction of the visual line. A display unit displays the generated image on a screen. Moreover, the setting unit sets a position of the viewpoint so that a relative position of the viewpoint to an object is fixed, sets a position of a target point included in a surface of a predetermined shape fixed relatively to the object at random, and sets a direction of the visual line so that an intersection point between the surface and the visual line gradually comes closer to the target point.

5 Claims, 7 Drawing Sheets

VIRTUAL SPACE DISPLAY DEVICE, VIEWPOINT SETTING METHOD, AND INFORMATION RECORDING MEDIUM

CROSS-REFERENCE TO RELATED APPLICATION

This application claims the benefit of Japanese Patent Application No. 2009-188155, filed on Aug. 14, 2009, the entire disclosure of which is incorporated by reference herein.

FIELD OF THE INVENTION

The present application relates to a virtual space display device which can appropriately generate a natural image with higher realistic sensation, a viewpoint setting method and an information recording medium.

BACKGROUND OF THE INVENTION

Gaming devices (e.g., a video gaming device) which allow a player to play action games and the like have been widespread. In such action games, for example, the player manipulates a player character (e.g., a main character) which is equipped with weapons, such as a gun and a sword. The player allows the player character to freely move in a virtual space (a game field, etc.), and to battle against an enemy character or the like. That is, such action games focus on battles.

The action games are not limited to games focusing on the battles. Recently, infiltrating games, which are a different kind of action game, are also known. In the infiltrating game, battles are avoided. In the infiltrating game, a player character infiltrates enemy lines and the like, hides so as not to be found by an enemy character while moving, and accomplishes a predetermined mission.

In these action games, in general, a viewpoint is appropriately set so that the player character is displayed in a game screen. For example, a virtual camera (a viewpoint position) is positioned obliquely upward, behind (back) the player character. A visual line is set in such a way that the player character is looked down upon from the viewpoint position. As the player character moves in the virtual space, the position of the virtual camera follows the player character. Consequently, it is possible to constantly display a game image which captures the player character in view.

For example, Unexamined Japanese Patent Application KOKAI Publication No. 2001-269482 (see pages 6 to 10, and FIG. 6) discloses a technology of displaying an image of a character (an object) which moves in such virtual space. According to a gaming device (a gaming system) disclosed in Unexamined Japanese Patent Application KOKAI Publication No. 2001-269482, a plurality of viewpoint positions are set, and such viewpoint positions are selectively changed depending on how the character moves or a relationship with other characters. Consequently, the gaming device (the gaming system) can display a game screen with realistic sensation without causing a player to feel uncomfortable.

SUMMARY

As explained above, the position of virtual cameras in conventional gaming devices follow the moving player character. At this time, if there is no obstacle or the like between the player character and the virtual camera, the virtual camera is always arranged at a position relatively fixed with reference to the position of the player character. Hence, a game image that is an image of the player character shot at a fixed angle from the virtual camera is displayed.

It is difficult for such game imaging to transmit movements of a player character with a genuine or realistic look and feel. Consequently, in some cases, the player does not sufficiently obtain a realistic experience of the game. Accordingly, a game image may be displayed as if the trailing virtual camera is jiggled by hand when the player character moves. For example, if an image is jiggled at a constant cycle, an image with hand jiggling can be realized.

However, when the image is jiggled in this fashion, and the player character moves, if the image is jiggled with regularity, the game conveys an unnatural or unrealistic feel to the player conversely. Consequently, the player is likely to get an impression that the image is virtual.

Accordingly, there is a demand to develop a gaming device which facilitates transmission of the movement of an object with a realistic feeling, and which can appropriately generate a natural image with higher realistic sensation.

The present application is being disclosed in view of the foregoing circumstances, and it is an object of the present application to provide a virtual space display device which can appropriately generate a natural image with higher realistic sensation, a viewpoint setting method and an information recording medium.

A virtual space display device according to a first aspect of the present application comprises a setting unit, a moving unit, a generating unit, and a display unit.

First, the setting unit sets a position of a viewpoint arranged in a virtual space, and a direction of a visual line extending from the viewpoint. The moving unit moves an object (e.g., a player character) in the virtual space in accordance with, for example, an operation by a player. The generating unit generates an image representing the way the virtual space in which the object moves is viewed from the set viewpoint toward the set direction of the visual line. The display unit displays the generated image on a screen.

Moreover, the setting unit sets a position of the viewpoint so that a relative position of the viewpoint to the object is fixed. The setting unit sets a position of a target point included in a surface of a predetermined shape, which is relatively fixed to the object at random. The setting unit further sets a direction of the visual line so that an intersection point between the surface and the visual line gradually comes closer to the target point.

The target point changes its position at random within a predetermined range relative to the object. Consequently, when a direction of the visual line is set toward the target point, an image which is irregularly jiggled is displayed. That is, a game image which gives the player a natural feeling of hand jiggling of a virtual camera is generated. Accordingly, the player can experience a realistic movement of the object.

As a result, it becomes possible to appropriately generate a natural image with higher realistic sensation.

The setting unit may generate a random number at every time interval which is associated beforehand with the object's moving speed, and may set a position of the target point according to the generated random number.

In this case, because the target point is set at every time interval in accordance with a speed of the object, a game image which gives the player a more natural feeling of hand jiggling of the virtual camera is generated.

The setting unit may generate a one-dimensional random number having a time that is associated beforehand with the object's moving speed as an expected value. The setting unit may also generate a two-dimensional random number having a position of a predetermined representative point in the surface as an expected value when a length of time corresponding to the generated one-dimensional random number elapses. Moreover, the setting unit may set a position of the target point at a position of the generated two-dimensional random number.

Note that the representative point may be, for example, the center of the surface.

In this case, the target point which changes its position in a planar manner at every time interval in accordance with a speed of the object is set. Consequently, a game image which gives the player a more natural feeling of hand jiggling of the virtual camera is generated.

A viewpoint setting method according to a second aspect of the present application is executed by a virtual space display device comprising a setting unit, a moving unit, a generating unit, and a display unit, and is configured to include a setting step, a movement step, a generating step, and a display step.

First, in the setting step, the setting unit sets a position of a viewpoint arranged in a virtual space, and a direction of a visual line extending from the viewpoint. In the movement step, the moving unit moves an object in the virtual space. In the generating step, the generating unit generates an image representing the way the virtual space in which the object moves, and that image is viewed from the set viewpoint toward the set direction of the visual line. In the display step, the display unit displays the generated image on a screen.

Moreover, in the setting step, the setting unit sets the position of the viewpoint so that a relative position of the viewpoint to the object is fixed. Furthermore, in the setting step, the setting unit sets a position of a target point included in a surface of a predetermined shape which is relatively fixed to the object at random. Moreover, in the setting step, the setting unit sets a direction of the visual line so that an intersection point between the surface and the visual line gradually comes closer to the target point.

The target point changes its position at random within a predetermined range relative to the object. As a direction of the visual line is set toward the target point, an image which is irregularly jiggled is displayed. That is, a game image which gives a player a natural feeling of hand jiggling of a virtual camera is generated. Consequently, the player can feel the movement of the object as a realistic experience.

As a result, it becomes possible to appropriately generate a natural image with a higher realistic sensation.

An information recording medium according to a third aspect of the present application records a program which allows a computer (including an electronic device) to function as a setting unit, a moving unit, a generating unit, and a display unit.

The setting unit sets a position of a viewpoint arranged in a virtual space, and a direction of a visual line extending from the viewpoint.

The moving unit moves an object in the virtual space.

The generating unit generates an image representing the way the virtual space in which the object moves is viewed from the set viewpoint toward the set direction of the visual line.

The display unit displays the generated image on a screen.

The setting unit sets the position of the viewpoint so that a relative position of the viewpoint to the object is fixed.

Moreover, the setting unit sets a position of a target position included in a surface of a predetermined shape which is relatively fixed to the object at random.

Furthermore, the setting unit sets a direction of the visual line so that an intersection point between the surface and the visual line gradually comes closer to the target point.

According to the present application, it is possible to allow a computer to function as the virtual display device, which operates as explained above.

The information recording medium may be a computer-readable information recording medium, such as a compact disk, a flexible disk, a hard disk, a magneto-optical disk, a digital video disk, a magnetic tape, or a semiconductor memory.

The program recorded in the information recording medium can be distributed and sold over a computer communication network independently from a computer that runs the program. Moreover, the information recording medium can be distributed and sold independently from that computer.

The present application can provide the virtual space display device which can appropriately generate a natural image with higher realistic sensation, the viewpoint setting method, and the information recording medium.

BRIEF DESCRIPTION OF THE DRAWINGS

A more complete understanding of this application can be obtained when the following detailed description is considered in conjunction with the following drawings, in which.

DETAILED DESCRIPTION

An explanation will be given of an embodiment of the present application. In order to facilitate understanding below, the explanation will be given of the embodiment in which the present application is applied to a gaming device, but the present application can be applied to various information processing devices, such as various computers, PDAs, and cellular phones in the same manner as the embodiment. That is, the following embodiment to be explained below is merely for explanation, and is not to limit the scope of the present application. Consequently, those skilled in the art can adopt embodiments in which some of or all of the structural elements are replaced with respective equivalents, and it should be understood that such embodiments are to be included within the scope of the present application.

First Embodiment

Figure 1:
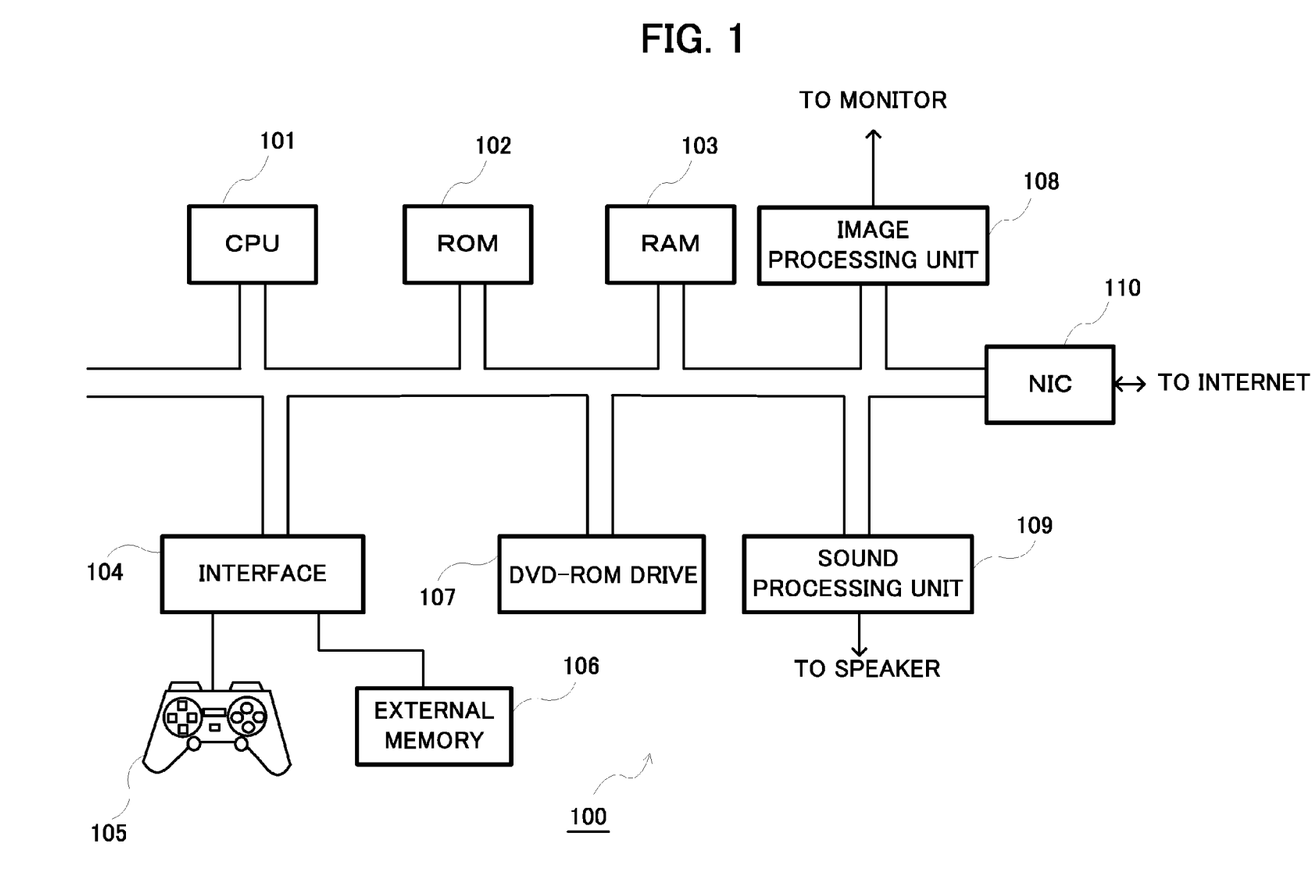
FIG. 1 is a block diagram showing a schematic configuration of a typical gaming device which realizes a virtual space display device according to an embodiment.

FIG. 1 is a block diagram showing a schematic configuration of a typical gaming device which realizes a virtual space display device according to an embodiment of the present application. An explanation will be given with reference to FIG. 1.

A gaming device 100 comprises a CPU (Central Processing Unit) 101, a ROM (Read Only Memory) 102, a RAM (Random Access Memory) 103, an interface 104, a controller 105, an external memory 106, a DVD (Digital Versatile Disc)-ROM drive 107, an image processing unit 108, a sound processing unit 109, and an NIC (Network Interface Card) 110.

First, a player loads a DVD-ROM which stores a program and data for games in the DVD-ROM drive 107. Next, the player turns on the gaming device 100. This allows the program to be run, and the virtual space display device of the embodiment is realized.

The CPU 101 controls the overall operation of the gaming device 100. The CPU 101 is connected to each structural element, and exchanges control signals and data. Note that the CPU 101 has an interval timer, and can clock a time in accordance with a set timer value.

An IPL (Initial Program Loader) which is executed immediately after the power is turned on is recorded in the ROM 102. When the IPL is executed, the program recorded in the DVD-ROM is read out in the RAM 103, thereby causing the CPU 101 to run the program. Moreover, the ROM 102 records a program and various data for an operating system. The operating system is necessary to control the overall operation of the gaming device 100.

The RAM 103 temporarily stores data and programs. The RAM 103 retains the program and data which are read out from the DVD-ROM, and other data necessary for the progress of a game and a chat communication.

The controller 105 which is connected through the interface 104 in an operable manner receives an operation input performed when a user plays a game. For example, the controller 105 receives an input of letter strings (messages) or the like in accordance with an operation input. In addition, the controller 105 receives, for example, an input of a movement instruction or the like to an operation-target character.

The external memory 106 is detachably connected through the interface 104. The external memory 106 stores data which represents a progress status of the game, and data like the log (a record) of a chat communication. The external memory 106 is rewritable. When the player inputs an instruction through the controller 105, these pieces of data may be appropriately recorded in the external memory 106.

The DVD-ROM is loaded in the DVD-ROM drive 107. The DVD-ROM may be utilized to record programs for realizing the game, and image data and sound data accompanying the game. Under the control of the CPU 101, the DVD-ROM drive 107 performs a read-out process on the DVD-ROM loaded therein. The DVD-ROM drive 107 reads out a necessary program and data. The read-out program and data are temporarily stored in the RAM 103 or the like.

The image processing unit 108 preferably cause an image computation processor (not illustrated) possessed by the CPU 101 and the image processing unit 108 to process data read from a DVD-ROM. Thereafter, the image processing unit 108 preferably records image information in a frame memory (not illustrated). The image information recorded in the frame memory is preferably converted into a video signal (an image signal) at a predetermined synchronization timing. The video signal (the image signal) is preferably output to a monitor connected to the image processing unit 108. This enables display of various images.

Note that the image computation processor can perform an overlay operation of two-dimensional images, a transparency operation like a blending, and various saturation operations at a high speed.

Moreover, the image computation processor can perform an operation of acquiring a rendered image at a high speed. The rendered image can be acquired by rendering polygon information through Z-buffering, and by looking down a polygon from a predetermined view position. The polygon is arranged in a virtual three-dimensional space. Moreover, various texture information is added to the polygon information.

Furthermore, as the CPU 101 and the image computation processor work together, it becomes possible to depict letter strings as a two-dimensional image in the frame memory, or on each polygon surface. The letter string is depicted in accordance with font information which defines the shape of a letter. The font information is recorded in the ROM 102. However, exclusive font information recorded in the DVD-ROM may be used.

The sound processing unit 109 preferably converts sound data which is read out from the DVD-ROM into an analog sound signal. Next, the sound processing unit 109 preferably supplies the sound signal to an external speaker and outputs sound. For example, the sound processing unit 109 preferably generates sound effects and music data to be generated during the progress of the game under the control of the CPU 101. The sound processing unit 109 preferably causes the speaker to output sound corresponding to the generated sound effect or the like.

The NIC 110 is preferably used when the gaming device 100 is connected to a computer communication network (not illustrated) like the Internet. The NIC 110 is an interface which intermediates various Internet-connecting devices (not illustrated) and the CPU 101. Such various Internet-connecting devices may be a 10BASE-T/100BASE-T compatible product which is used for establishing a LAN (Local Area Network), an analog modem, an ISDN (Integrated Services Digital Network) modem, and an ADSL (Asymmetric Digital Subscriber Line) modem which are for connecting to the Internet via a telephone line, and a cable modem for connecting to the Internet via a cable television line and the like.

Moreover, the gaming device 100 may have a large-capacity external memory device like a hard disk drive which functions as the ROM 102, the RAM 103, the external memory 106, and the DVD-ROM loaded in the DVD-ROM drive 107 and the like.

Furthermore, a configuration that a keyboard and a mouse are connected may be employed. The keyboard receives an editing input of letter strings from a user. Moreover, the mouse receives inputs of specifying and selecting various positions.

Furthermore, instead of the gaming device 100 of the embodiment, an ordinary computer (e.g., a general-purpose personal computer) can be used as the virtual space display device. For example, the ordinary computer comprises, like the gaming device 100, a CPU, a RAM, a ROM, a DVD-ROM drive, and an NIC. The ordinary computer further comprises an image processing unit which has a simpler function than that of the gaming device 100. Moreover, the ordinary computer may have a hard disk drive as an external memory device, and can use a flexible disk, a magneto-optical disk, a magnetic tape and the like. Furthermore, in the ordinary computer, a keyboard and a mouse are used as an input device instead of a controller. When a program for games is installed and is run, the ordinary computer functions as the virtual space display device.

<General Configuration of the Virtual Space Display Device>

Figure 2:
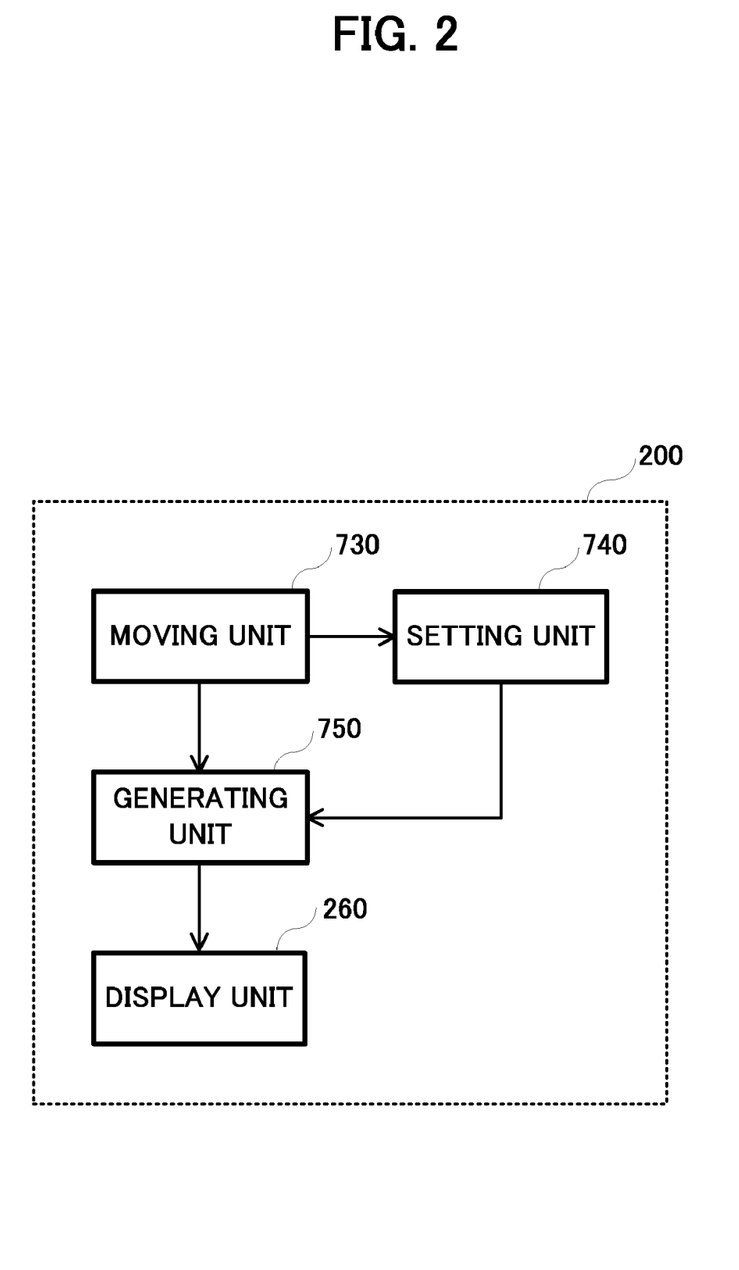
FIG. 2 is a block diagram for explaining a general configuration of structural elements of the virtual space display device according to the embodiment.

FIG. 2 is a block diagram for explaining a general configuration of structural elements of the virtual space display device, assuming that a virtual space display device 200 executes an action game which freely moves a player character in a virtual space (e.g., a game field) in accordance with an operation by a player. An explanation will be given with reference to the FIG. 2.

The virtual space display device 200 comprises a moving unit 730, a setting unit 740, a generating unit 750, and a display unit 260.

The moving unit 730 preferably moves an object in the virtual space.

The setting unit 740 preferably sets a position of a viewpoint arranged in the virtual space, and a direction of a visual line extending from the viewpoint.

The generating unit 750 preferably generates an image representing the way the virtual space where the object moves is viewed from the set viewpoint into the set direction of the visual line.

The display unit 260 preferably displays the generated image on a screen.

Note that the setting unit 740 sets the position of the viewpoint in such a way that a relative position of the viewpoint to the object is fixed.

The setting unit 740 randomly preferably sets a position of a target point included in a plane of a predetermined shape which is relatively fixed to the object.

Moreover, the setting unit 740 preferably sets a direction of the visual line in such a way that an intersection point between the plane and the visual line gradually comes close to the target point.

Figure 3:
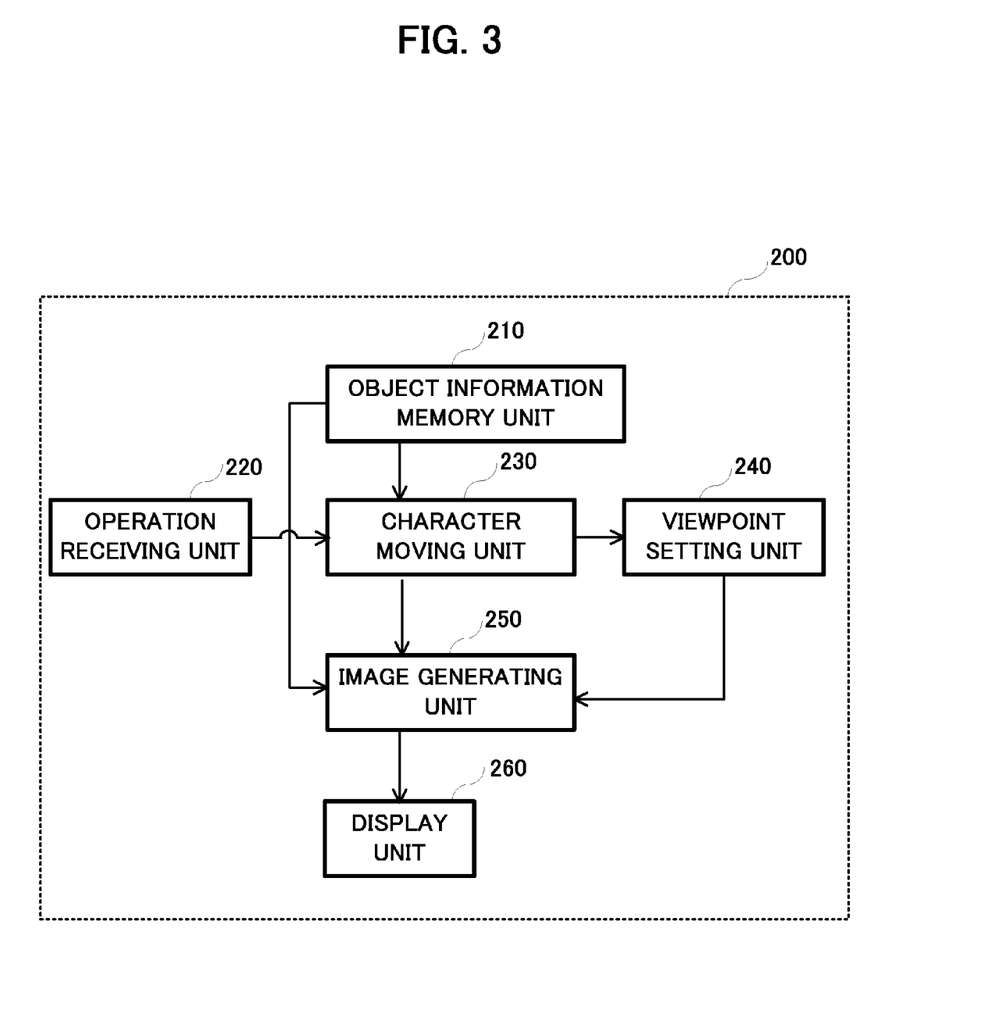
FIG. 3 is a block diagram for explaining the general configuration of the virtual space display device shown in FIG. 2 in detail.

FIG. 3 is a block diagram showing the schematic configuration of the virtual space display device 200 further in detail. An explanation will be given with reference to this diagram.

The virtual space display device 200 preferably comprises an object information memory unit 210, an operation receiving unit 220, a character moving unit 230, a viewpoint setting unit 240, an image generating unit 250, and a display unit 260. Moreover, although functions of individual units are correlated with one another, it is possible to appropriately change employment/non-employment of individual units depending on purposes.

First, the object information memory unit 210 preferably stores information on various objects, such as a player character (e.g., a main character), an enemy character, a tree, a rock, and a building. Each object is preferably arranged in a virtual space. More specifically, information on each object, such as a three-dimensional model and a texture, is preferably stored.

Note that the DVD-ROM which is loaded in the DVD-ROM drive 107, the RAM 103 and the like can function as the object information memory unit 210.

The operation receiving unit 220 preferably receives an operation input like an action instruction or the like to a player character operated by a player. For example, any one of a plurality of buttons (e.g., a direction key, an A button, a B button, an X button, and a Y button arranged on the controller 105) which may correspond to respective actions, such as, for example, moving in a predetermined direction, using a sword or a weapon (shooting a gun or wield a sword), picking up an item, squatting down, and lying down may be pressed by the player, and this action is regarded as performed by an operation input. Note that movement instructions to the player character may include an instruction of walking, running, or the like as an example.

Note that the controller 105 can function as the operation receiving unit 220.

The character moving unit 230 preferably corresponds to the moving unit 730 as explained above.

The character moving unit 230 accordingly preferably moves a character in a virtual space. For example, the character moving unit 230 may manage positional information (e.g., a current position and a direction) on a player character, an enemy character or the like in the virtual space, and moves a character by changing a current position and a direction of the character.

More specifically, the character moving unit 230 may move the player character in the virtual space in accordance with a movement instruction or the like received by the operation receiving unit 220. Moreover, the enemy character in the virtual space is preferably moved in accordance with a predetermined logic or the like.

Note that the RAM 103 and the CPU 101 can function as the character moving unit 230.

The viewpoint setting unit 240 preferably corresponds to the setting unit 740 as explained above.

For example, in a case of a third-person viewpoint mode (a looking-down viewpoint), the viewpoint setting unit 240 preferably sets a position of a virtual camera (a view point position) obliquely upward and behind (back) a player character. The viewpoint setting unit 240 sets a direction of a visual line so that the player character is looked down from the position of the virtual camera.

Figure 4A:
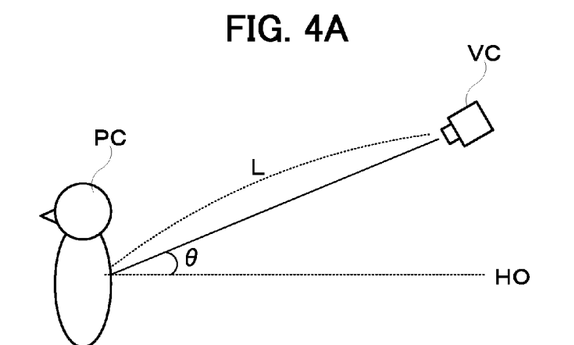
FIG. 4A is a diagram for explaining how a direction of a visual line is asymptotically set.

As an example, as shown in FIG. 4A, the viewpoint setting unit 240 preferably sets a position of a virtual camera VC at a position separated by a fixed distance L at an angle θ with reference to a horizontal surface HO behind the player character PC. Note that the viewpoint setting unit 240 preferably sets the position of the virtual camera VC so as to follow the movement of the player character PC when the player character PC moves in the virtual space. That is, a position of a viewpoint is preferably set so that a relative position of the viewpoint to the player character PC is fixed. When there is an obstacle or the like between the player character PC and the virtual camera VC, the position of the virtual camera VC is preferably appropriately set so as to avoid the obstacle or the like.

Figure 4B:
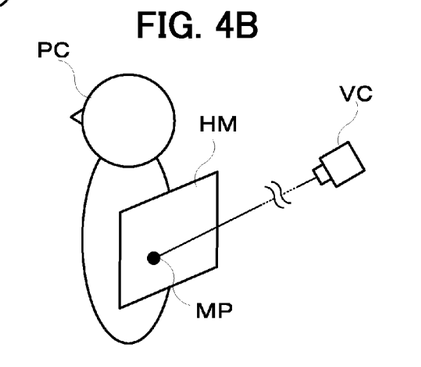
FIG. 4B is a diagram for explaining how the direction of the visual line is asymptotically set.

Moreover, the viewpoint setting unit 240 preferably sets a target point MP on a flat surface HM having, for example, a predetermined size as shown in FIG. 4B, assuming that the flat surface HM is defined with reference to a waist part of the player character PC. The viewpoint setting unit 240 preferably sets a direction of a visual line of the virtual camera VC toward the target point MP. A reference position (an initial position) of the target point MP is preferably defined, for example, at the center of the flat surface HM. When the player character PC is not moving, the target point MP is preferably set at the reference position (i.e., the center) of the flat surface HM. Conversely, when the player character PC is moving, the target point MP is preferably set in the flat surface HM at random. Note that, in FIG. 4B, although the flat surface HM is preferably formed in a rectangle, a shape of the flat surface HM and a size of thereof are merely examples, and the shape of such flat surface may be a circular shape or the like other than the rectangle. Moreover, although a planar surface is used as the flat surface HM to facilitate understanding, a shape of the surface may be a curved surface or the like other than the planar surface.

An explanation will be given of setting of a position of the target point MP in detail. The viewpoint setting unit 240 preferably generates a random number at a time interval corresponding to a speed at which the player character PC moves. The viewpoint setting unit 240 sets the target point MP at a position shifted from a center on the flat surface HM according to the random number.

In more detail, while the player character PC is running, for example, the viewpoint setting unit 240 generates a one-dimensional random number having a time associated with running (a speed) as an expected value. More specifically, the viewpoint setting unit 240 preferably acquires a timer value (an interval timer value) T by multiplying a reference time (a base value corresponding to a speed) by a random value. As a specific example, the viewpoint setting unit 240 preferably acquires the timer value T through an operation of an equation 1 below. Because the viewpoint setting unit 240 acquires the timer value T by multiplying a sum of two random values each within a value of 1 by a base value, the timer value T becomes zero time to twice as much as the base value.

$$T = Tb \times (Ra + Rb) \quad \text{[Equation 1]}$$

where:
T: a timer value
Tb: a base value (a time to be a base corresponding to a speed)
Ra, Rb: random values (each within a value of 1)

Note that the equation 1 is an example for specifically explaining how to calculate the timer value T. Accordingly, calculation method of the timer value T is not limited to this equation. The viewpoint setting unit 240 may calculate the timer value T through other equations.

Figure 4C:
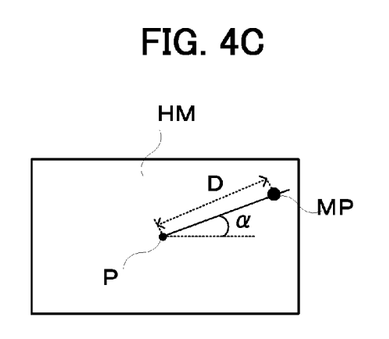
FIG. 4C is a diagram for explaining how the direction of the visual line is asymptotically set.

The viewpoint setting unit 240 preferably generates a two-dimensional random number having a center position of the flat surface HM as an expected value after a time having the acquired timer value T has elapsed. More specifically, as shown in FIG. 4C, the viewpoint setting unit 240 preferably acquires a shifted angle α at random with reference to a center P, and further acquires a shifted amount (an amount to be shifted) D at random. More specifically, the viewpoint setting unit 240 preferably acquires the shifted amount D by multiplying a reference shifted amount (a base shifted amount) by a random value or the like. As a specific example, the viewpoint setting unit 240 preferably acquires the shifted amount D through an operation of equation 2 below.

$$D = Db \times (R + 0.2) \quad \text{[Equation 2]}$$

where:
D: a shifted amount
Db: a base shifted amount (an amount to be a base)
R: a random value (within a value of 1)
0.2: a value to avoid being 0 (the value is not limited to 0.2, and can be appropriately changed)

Note that the equation 2 is an example for specifically explaining how to calculate the shifted amount D. Accordingly, the calculation method of the shifted amount D is not limited to this equation. The viewpoint setting unit 240 may calculate the shifted amount D through other equations. In this manner, the viewpoint setting unit 240 preferably sets the target point MP at a position shifted from the center P by the shifted amount D on a line of the shifted angle α.

Figure 4D:
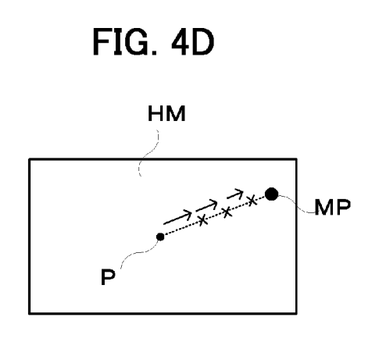
FIG. 4D is a diagram for explaining how the direction of the visual line is asymptotically set.

The viewpoint setting unit 240 preferably sets a direction of a visual line of the virtual camera VC so that the virtual camera is directed to the set target point MP. At this time, if the viewpoint setting unit 240 directly sets a direction of the visual line toward the target point MP, an image is jiggled too hard. Consequently, the viewpoint setting unit 240 sets a direction of the visual line so that the visual line asymptotically approaches the target point MP for multiple times. For example, as shown in FIG. 4D, the viewpoint setting unit 240 sets a direction of the visual line so that the visual line asymptotically approaches the target point MP for multiple times. At this time, the viewpoint setting unit 240 changes the asymptotic value (an amount to be asymptotically approached) until the visual line penetrates the target point MP within a range of, for example, plus or minus 25%.

Accordingly, the viewpoint setting unit 240 preferably sets the target point MP at a position irregularly shifted from the center P of the flat surface HM at a time (a base value multiplied by a random value) interval corresponding to the speed of the player character PC. The viewpoint setting unit 240 sets a direction of the visual line so that the visual line asymptotically approaches the target point MP for multiple times.

Figure 5A:
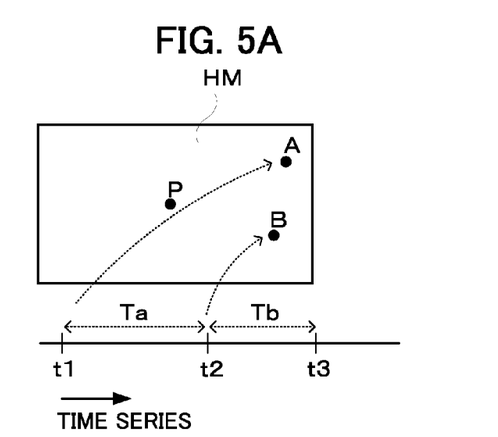
FIG. 5A is a diagram for explaining an example generated game image.

More specifically, an explanation will be given of a case in which, with the target point MP being at the center P, a timer value Ta is calculated and an A point is calculated as a target point at a time t1, and then a timer value Tb is calculated at a time t2 as shown in FIG. 5A.

Figure 5B:
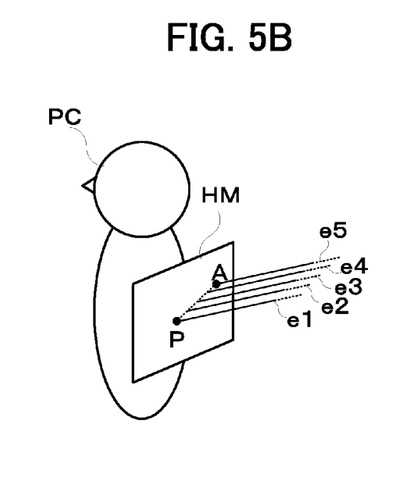
FIG. 5B is a diagram for explaining the example generated game image.

First, as shown in FIG. 5B, the viewpoint setting unit 240 has set a visual line e1 at the center P at the time t1. While a time having the calculated timer value Ta elapses, i.e., from the time t1 to the time t2, the viewpoint setting unit 240 preferably sequentially sets visual lines e2, e3, e4, and e5 in this order toward the calculated A point. That is, the viewpoint setting unit 240 preferably asymptotically sets a direction of the visual line from the center P to the A point.

Figure 5C:
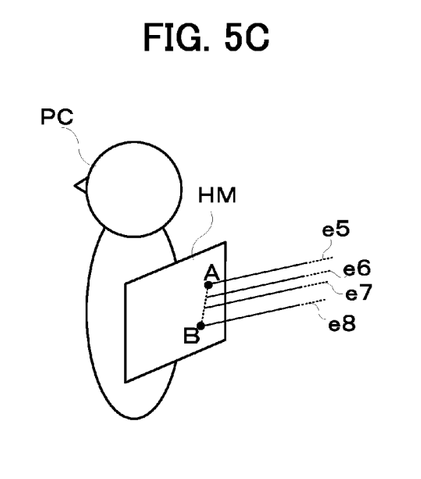
FIG. 5C is a diagram for explaining the example generated game image.

Next, as shown in FIG. 5C, the viewpoint setting unit 240 has set the visual line e5 at the A point at the time t2. While a time having the calculated timer value Tb elapses, i.e., from the time t2 to a time t3, the viewpoint setting unit 240 preferably sequentially sets visual lines e6, e7, and e8 in this order toward a calculated B point. That is, the viewpoint setting unit 240 asymptotically sets a direction of the visual line from the A point to the B point.

The viewpoint setting unit 240 preferably repeats the same process after time t3 if the player character PC is moving.

The CPU 101 can function as the viewpoint setting unit 240.

Returning now to FIG. 3, the image generating unit 250 preferably corresponds to the generating unit 750. The image generating unit 250 preferably generates a game image which represents the interior of a virtual space as viewed from a viewpoint toward a direction of a visual line. The image is preferably generated in accordance with information on an object stored in the object information memory unit 210, positional information on a character managed by the character moving unit 230, and a position of a virtual camera and a direction of a visual line both set by the viewpoint setting unit 240.

Figure 6A:
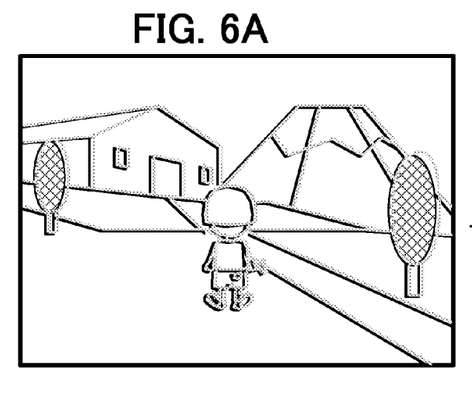
FIG. 6A is a diagram for explaining an example generated game image.

For example, as shown in FIG. 6A, the image generating unit 250 preferably generates a game image that allows a player to feel hand jiggling of the virtual camera.

Figure 6B:
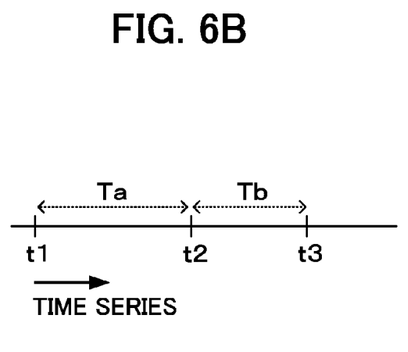
FIG. 6B is a diagram for explaining the example generated game image.
Figure 6C:
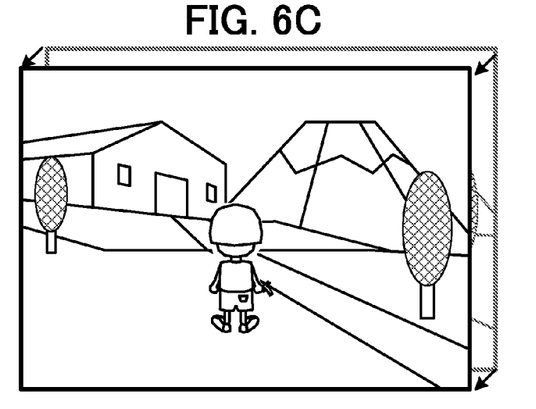
FIG. 6C is a diagram for explaining the example generated game image.
Figure 6D:
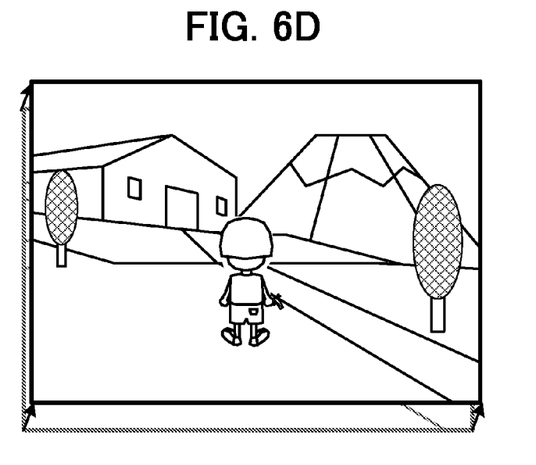
FIG. 6D is a diagram for explaining the example generated game image.

More specifically, an explanation will be given of a case in which the viewpoint setting unit 240 sets a direction of a visual line as shown in FIG. 5A to FIG. 5C. As shown in FIG. 6C, the image generating unit 250 preferably generates a jiggled game image that faces toward the direction of the arrows from the time t1 to the time t2 (while the timer value Ta elapses) in FIG. 6B. Moreover, as shown in FIG. 6D, the image generating unit 250 preferably generates a jiggled game image that moves toward the direction of the arrows from the time t2 to the time t3 (while the timer value Tb elapses) in FIG. 6B.

In this manner, the image generating unit 250 irregularly jiggles an image together with the movement of the player character. Consequently, the image generating unit 250 can generates a game image that allows a player to have a more realistic and natural virtual camera hand jiggling experience.

Note that the image processing unit 108 can function as the image generating unit 250.

Returning now to FIG. 3, the display unit 260 preferably displays a game image. That is, the display unit 260 preferably sequentially displays game images generated by the image generating unit 250.

For example, with a player character being moving, the display unit 260 displays a hand jiggling game image as shown in FIG. 6A.

Note that a monitor or the like connected to the gaming device 100 can function as the display unit 260.

<General Operation of the Virtual Space Display Device>

Figure 7:
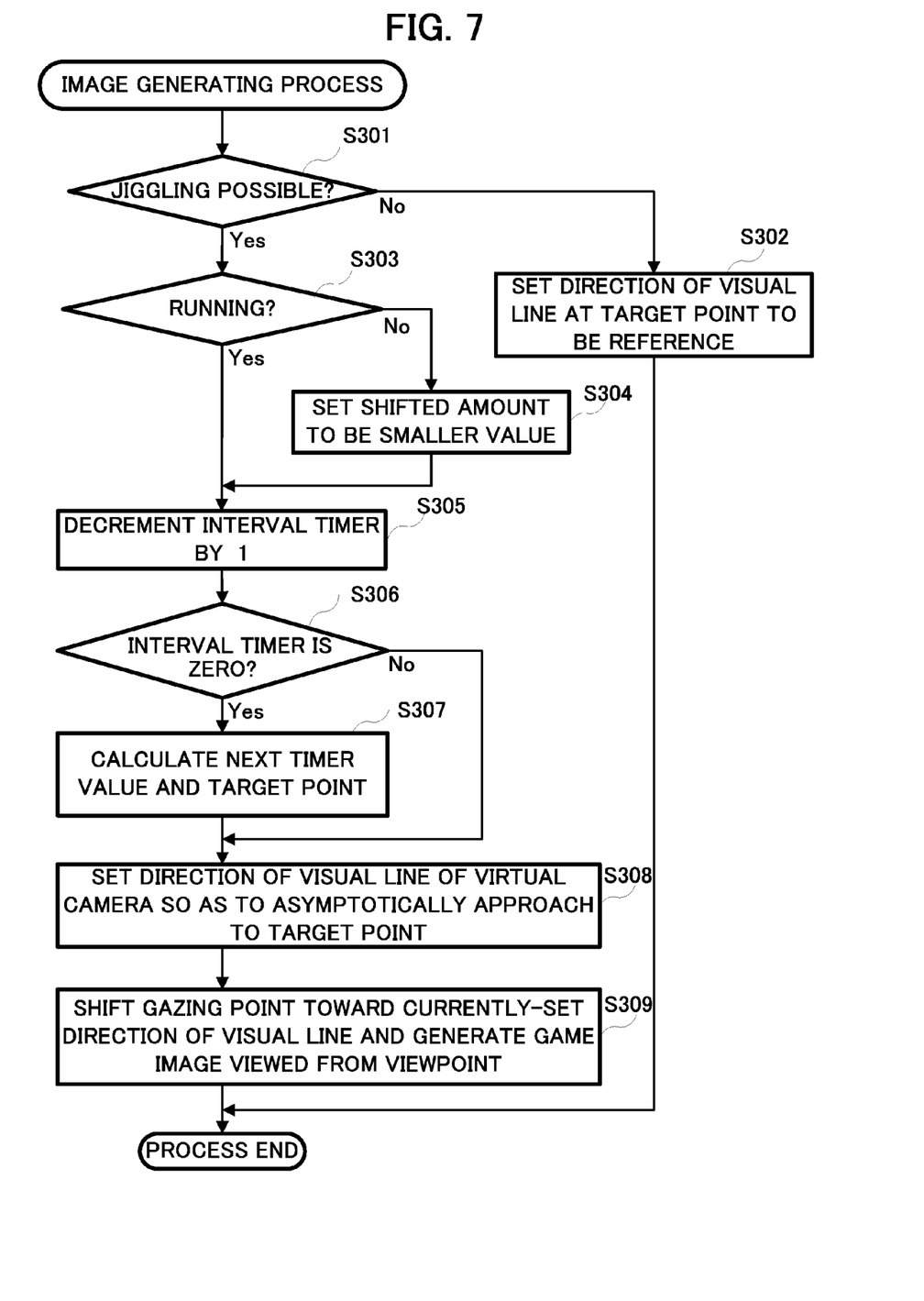
FIG. 7 is a flowchart for explaining an image generating process according to the embodiment.

An explanation will be given of an operation of the virtual space display device 200 having the above-explained configuration with reference to the accompanying drawings. As an example, the explanation will be given of an operation of the virtual space display device 200 when a player character operated by a player moves in a virtual space. More specifically, the explanation will be given of an image generating operation of the virtual space display device 200 performed while a player is playing an action game with reference to FIG. 7. FIG. 7 is a flowchart showing a flow of an image generating process repeated for every depicting cycle (e.g., 1/60 second cycle) as an example.

First, the virtual space display device 200 preferably determines whether jiggling is possible (step S301).

That is, the virtual space display device 200 preferably determines whether jiggling is possible. For example, when a game is played in a third-person viewpoint mode, jiggling is possible. Note that although the game is played in the third-person viewpoint mode, when the amount of movement of the player character is less than a fixed value (e.g., in a resting state), the virtual space display device 200 preferably determines that jiggling is not possible.

When determining that jiggling is not possible (step S301; No), the virtual space display device 200 preferably sets a direction of a visual line at a target point which is to be a reference (step S302).

That is, the viewpoint setting unit 204 preferably initializes a shifted amount to be zero, and sets the target point MP at the center P of the flat surface HM shown in FIG. 4C and the like. The virtual space display device 200 preferably terminates (completes) the image generating process as it is.

Conversely, when determining that jiggling is possible (step S301; Yes), the virtual space display device 200 preferably determines whether the player character is running (step S303).

That is, the character moving unit 230 preferably determines whether the moving player character is running. Note that the character moving unit 230 may determine whether the player character is running according to whether or not an operation instruction of running is given.

If the character moving unit 230 determines that the player character is not running (step S303; No), the virtual space display device 200 preferably sets a shifted amount to be a small value (step S304) and decrements an interval timer by −1 (step S305).

That is, because the player character is walking, the viewpoint setting unit 240 preferably sets the shifted amount to be a defined small value. In other words, when the player character is walking, the viewpoint setting unit 240 preferably sets the shifted amount to be small so as to generate a game image that jiggles slightly (hand jiggling is little).

On the other hand, if the character moving unit 230 determines that the player character is running (step S303; Yes), the virtual space display device 200 preferably decrements an interval timer by −1 (step S305).

That is, the virtual space display device 200 preferably counts down the interval timer which is operating based on a currently-set timer value.

The virtual space display device 200 preferably determines whether the interval timer reaches zero (step S306). That is, the virtual space display device 200 preferably determines whether the time having the currently-set timer value has elapsed.

If the virtual space display device 200 preferably determines that the interval timer does not reach zero (step S306; No), the virtual space display device 200 progresses to step S308, which is discussed later.

That is, if the time having the currently-set timer value has not elapsed, the virtual space display device 200 preferably omits calculation of a timer value and a target point.

Conversely, when determining that the interval timer reaches zero (step S306; Yes), the virtual space display device 200 preferably calculates a next timer value and target point (step S307).

That is, the viewpoint setting unit 204 preferably acquires a timer value through an operation of equation 1. In other words, the viewpoint setting unit 204 preferably acquires the timer value by multiplying a reference time (a base value) by a random value. The viewpoint setting unit 204 preferably sets the acquired timer value of the interval timer.

Moreover, the viewpoint setting unit 240 preferably calculates a target point. That is, as shown in FIG. 4C, the viewpoint setting unit 240 preferably acquires the shifted angle α at random with reference to the center P, and further preferably acquires the shifted amount D at random. More specifically, the viewpoint setting unit 240 may acquire the shifted amount D through an operation of equations 2. Accordingly, the viewpoint setting unit 240 preferably sets the target point MP at a position shifted by the shifted amount D from the center P on a line of the shifted angle α.

The virtual space display device 200 preferably sets a direction of a visual line of a virtual camera so as to asymptotically approach to a target point (step S308).

That is, the viewpoint setting unit 240 preferably sets a direction of the visual line so as to asymptotically approach the target point MP for multiple times as shown in FIG. 4D. For example, the viewpoint setting unit 240 changes an asymptotic amount (an amount for current time) until the visual line penetrates the target point MP within a range plus or minus 25.

More specifically, the viewpoint setting unit 240 preferably asymptotically sets the direction of the visual line to the target point MP as shown in FIG. 5B and FIG. 5C.

The virtual space display device 200 preferably shifts a gazing point toward a currently-set direction of a visual line, and generates a game image viewed from a viewpoint (step S309).

That is, the image generating unit 250 preferably generates a game image in accordance with information on an object stored in the object information memory unit 210, positional information on a character managed by the character moving unit 230, and a position of a virtual camera and a direction of a visual line both set by the viewpoint setting unit 240. Note that the game image represents the interior of a virtual space as viewed from the viewpoint and in the direction of the visual line. Thereafter, the virtual space display device 200 terminates the image generating process.

Accordingly, as such image generating process is repeated, every time a time having a random timer value elapses, the target point MP is preferably set at a position shifted from the center of the flat surface HM at random. A direction of a viewpoint (a gazing point) is shifted for multiple times so as to come close to the target point MP. Accordingly, with a player character being moving (running), a game image which is jiggled at random is generated. That is, a game image that allows a player to experience a realistic feel of a hand jiggling of the virtual camera is generated, as shown in FIG. 6A. Consequently, the player can also experience a realistic feel of the player character's movements.

As a result, appropriate formations of a natural image with a higher realistic sensation are possible.

Other Embodiments

In the foregoing embodiment, the explanation has been given of a case in which the virtual space display device 200 determines only whether a player character is running or walking (in walking), and divides the process at the step S303 in the image generating process shown in FIG. 7. However, a shifted amount may be changed in accordance with the speed of a moving player character.

For example, the virtual space display device 200 preferably calculates a speed of a player character regardless of whether the player character is running or walking instead of the determination process in the step S303. The virtual space display device 200 preferably sets a base shifted amount (Db in equation 2) in accordance with the calculated speed in the following step S303.

Accordingly, the shifted amount D is more likely to change in accordance with the speed that the player character PC moves. Consequently, the slower the speed of the player character PC, the less an image is jiggled. Conversely, the faster the speed, the more an image is jiggled.

In this case, it is also possible to appropriately generate a natural image with a higher realistic sensation.

In the foregoing embodiment, in order to set a random target point, the explanation has been given of a case in which the virtual space display device 200 sets the target point MP at a position shifted from the center P by the shifted amount D on a line of the shifted angle α as shown in FIG. 4C. However, the approach used for setting the target point MP is not limited to the technique of acquiring the target point MP based on the angle α and the shifted amount D, instead other techniques may be utilized.

For example, the jiggling (shifting) may be limited to vertical jiggling. In this case, the virtual space display device 200 may acquire a waveform (e.g., a sine waveform) having a period in accordance with the moving speed of a player character. The virtual display device 200 may also acquire, as a shifted amount in the vertical direction, a value accordingly increased and decreased with a random value in reference with a point on the waveform in accordance with a time course.

Moreover, in the foregoing embodiment, the explanation has been given of a case in which a new target point is acquired every time a time having a timer value elapses. However, the virtual space display device 200 may alternately acquire a new target point. For example, after the virtual space display device 200 acquires and sets a new target point, a visual line is necessarily directed to a reference position at a center. That is, a direction of a visual line of a virtual camera may be moved so that the virtual camera is alternately directed to a target point (a new target point) and the reference position every time a time having a timer value elapses.

In the foregoing embodiment, although the explanation has been given of a case in which the present application is applied to an action game, the present application is not limited to such action games, and is appropriately applicable to a game that a virtual camera is set along with movement of an object.

As described above, according to the present invention, it is possible to provide the virtual space display device which can appropriately generate a natural image with higher realistic sensation, the viewpoint setting method, and the information recording medium.

Having described and illustrated the principles of this application by reference to preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A virtual space display device comprising:
   a setting unit which sets a position of a viewpoint arranged in a virtual space, and a direction of a visual line extending from the viewpoint;
   a moving unit which moves an object in the virtual space;
   a generating unit which generates an image representing the way the virtual space in which the object moves is viewed from the set viewpoint toward the set direction of the visual line, the image including a graphical representation of the object; and
   a display unit which displays the generated image on a screen, and wherein the setting unit sets the position of the viewpoint so that a relative position of the viewpoint to the graphical representation of the object is fixed,
   the setting unit randomly sets a new position of a target point included in a surface of a predetermined shape, the predetermined shape being relatively fixed to the object, and
   the setting unit sets a direction of a visual line from the viewpoint to the surface as the visual line geometrically travels from an initial position of the target point to the new position of the target point, the setting unit sets the direction of the visual line so that an intersection point between the surface and the visual line gradually comes geometrically closer to the target point.

2. The virtual space display device according to claim 1, wherein the setting unit generates a random number at every time interval which is associated beforehand with the object's moving speed that the object moves, and sets a position of the target point according to the generated random number.

3. The virtual space display device according to claim 1, wherein the setting unit generates a one-dimensional random number having a time which is associated beforehand with the object's moving speed as an expected value, generates a two-dimensional random number having a position of a predetermined representative point in the surface as an expected value when a length of time corresponding to a length of the generated one-dimensional random number elapses, and sets a position of the target point at a position of the generated two-dimensional random number.

4. A viewpoint setting method executed by a virtual space display device comprising a setting unit, a moving unit, a generating unit, and a display unit, the viewpoint setting method including:

a setting step in which the setting unit sets a position of a viewpoint arranged in a virtual space, and a direction of a visual line extending from the viewpoint;

a movement step in which the moving unit moves an object in the virtual space;

a generating step in which the generating unit generates an image representing the way the virtual space in which the object moves is viewed from the set viewpoint toward the set direction of the visual line, the image including a graphical representation of the object; and a display step in which the display unit displays the generated image on a screen, and wherein in the setting step, the setting unit sets the position of the viewpoint so that a relative position of the viewpoint to the graphical representation of the object is fixed, in the setting step, the setting unit randomly sets a new position of a target point included in a surface of a predetermined shape, the predetermined shape being relatively fixed to the object, and in the setting step, the setting unit sets a direction of a visual line from the viewpoint to the surface as the visual line geometrically travels from an initial position of the target point to the new position of the target point, the setting unit sets the direction of the visual line so that an intersection point between the surface and the visual line gradually comes geometrically closer to the target point.

5. A non-transitory computer-readable information recording medium recording a program which allows a computer to function as:

a setting unit which sets a position of a viewpoint arranged in a virtual space, and a direction of a visual line extending from the viewpoint;

a moving unit which moves an object in the virtual space;

a generating unit which generates an image representing the way the virtual space in which the object moves is viewed from the set viewpoint toward the set direction of the visual line, the image including a graphical representation of the object; and a display unit which displays the generated image on a screen, and wherein the setting unit sets the position of the viewpoint so that a relative position of the viewpoint to the graphical representation of the object is fixed, the setting unit randomly sets a new position of a target position included in a surface of a predetermined shape, the predetermined shape being relatively fixed to the object, and the setting unit sets a direction of a visual line from the viewpoint to the surface as the visual line geometrically travels from an initial position of the target point to the new position of the target point, the setting unit sets the direction of the visual line so that an intersection point between the surface and the visual line gradually comes geometrically closer to the target point.

* * * * *